POSITIONING SYSTEM

Filed Jan. 12, 1967

INVENTORS
WILLIAM L. DUDA
HAROLD FLEISHER
JERRY L. REYNOLDS

BY Owen Lamb
AGENT

United States Patent Office 3,541,338
Patented Nov. 17, 1970

3,541,338

POSITIONING SYSTEM

William L. Duda, Wappingers Falls, Harold Fleisher, Poughkeepsie, and Jerry L. Reynolds, Wappingers Falls, N.Y., assignors to International Business Machines Corporation, Armonk, N.Y., a corporation of New York Filed Jan. 12, 1967, Ser. No. 608,809
Int. Cl. G08c 9/06
U.S. Cl. 250—219 5 Claims

ABSTRACT OF THE DISCLOSURE

Apparatus for positioning a Lippmann film type of read-only memory plate, so that the information stored on the plate can be read by an optical reader.

Noncolinear registration areas located either inside or outside the information area of the storage plate have a pattern written therein. Light sources are selectively pulsed at each area during a positioning sequence and the reflected light is detected. The detcted information is gated through a decoder circuit which provides a table lookup function where the information is changed into position vectors. The vectors are then fed to a translator circuit which activates X, Y and angle position servo systems. An error signal is provided to the servo system which moves the memory plate until the light spot strikes a predetermined pattern of frequencies signifying the center of the registration area. When this occurs, the plate is properly positioned.

CROSS REFERENCE TO RELATED APPLICATIONS

Copending patent application 285,832—Light Beam Deflection by T. J. Harris et al., filed June 5, 1963, discloses a light beam positioning system using electro-optic techniques to digitally index the position of beam of light. The beam of light falls upon a memory plate which has photographic spots recorded thereon.

Apparatus for reading the stored information by means of the light beam from any storage spot is shown in patent application number 332,755 "Read Only Memory" by Fleisher et al., filed Dec. 23, 1963.

BACKGROUND OF THE INVENTION

Field of the invention

This invention relates to positioning systems and more particularly to apparatus for indexing and registering a memory plate in an optical memory system.

Description of the prior art

In the aforementioned Fleisher et al. application a standing wave read-only memory is disclosed in which the information is stored on a transparent film in the form of light reflecting layers. A film recorded in this manner is known as a Lippmann film. When light is directed at the film in which such layers have been formed, a coherent reflective scattering of the light is obtained if the spot hit is of the same frequency as that which resulted in the original formation of the layers. Light of other frequencies is reflected incoherently from the layers, resulting in a considerably reduced intensity relative to the coherent reflected light of a recorded froquency. By directing light at the film in which information has been recorded and noting what coherent reflective light frequency is obtained, it is determined if the film contains information corresponding to that frequency.

Since the film plates may be removed from the memory apparatus after exposure for processing and later reinserted, re-registration of the film plate to within a specific tolerance must be accomplished.

SUMMARY OF THE INVENTION

It is a primary object of this invention to provide a registration system for an optical read-only memory in which each memory plate can be aligned for registration.

It is a further object of this invention to provide an optical system for indicating the position of a movable element.

The above objects are accomplished in accordance with the invention by providing at least one registration area located on the element to be moved. The area comprises a photographic film in which light reflecting layers are exposed, so that when struck by a light beam the film reflects one or more component light frequencies. A light source is located so as to reflect light from the registration area when the movable element is positioned. A detector detects light reflected from the registration area and distinguishes component frequencies present in the reflected light. The movable element is moved with respect to the light source until a predetermined combination of frequencies is detected by the detector.

The foregoing and other objects, features and advantages of the invention will be apparent from the following more particular description of a preferred embodiment of the invention as illustrated in the accompanying drawings.

BRIEF DESCRIPTION OF THE DRAWINGS

Referring now to FIG. 1, the memory system comprises an electro-optical light beam deflector 10 of the type disclosed in the above-identified Harris et al. application. A light beam is supplied to the electro-optical deflector 10 by means of lasers or other monochromatic light sources 12 which are directed to a grating or dispersive medium 14 to form a single beam of light directed to the electro-optical deflector 10. The beam of light is controlled by deflection control circuitry 16 which actuates the electro-optical deflector. A description of this can be found in an article entitled "A Fast, Digital-indexed Light Deflector," Kulcke et al., IBM Journal of Research and Development, vol. 8, No. 1, January 1964, pages 64–67. The light beam output from the electro-optical deflector 10 passes through a beam splitter 18 onto a standing wave memory plate 20. The light reflected from the plate 20 is reflected from beam splitter 18 to a reading device 36, 38, 40, 42.

Figure 1:
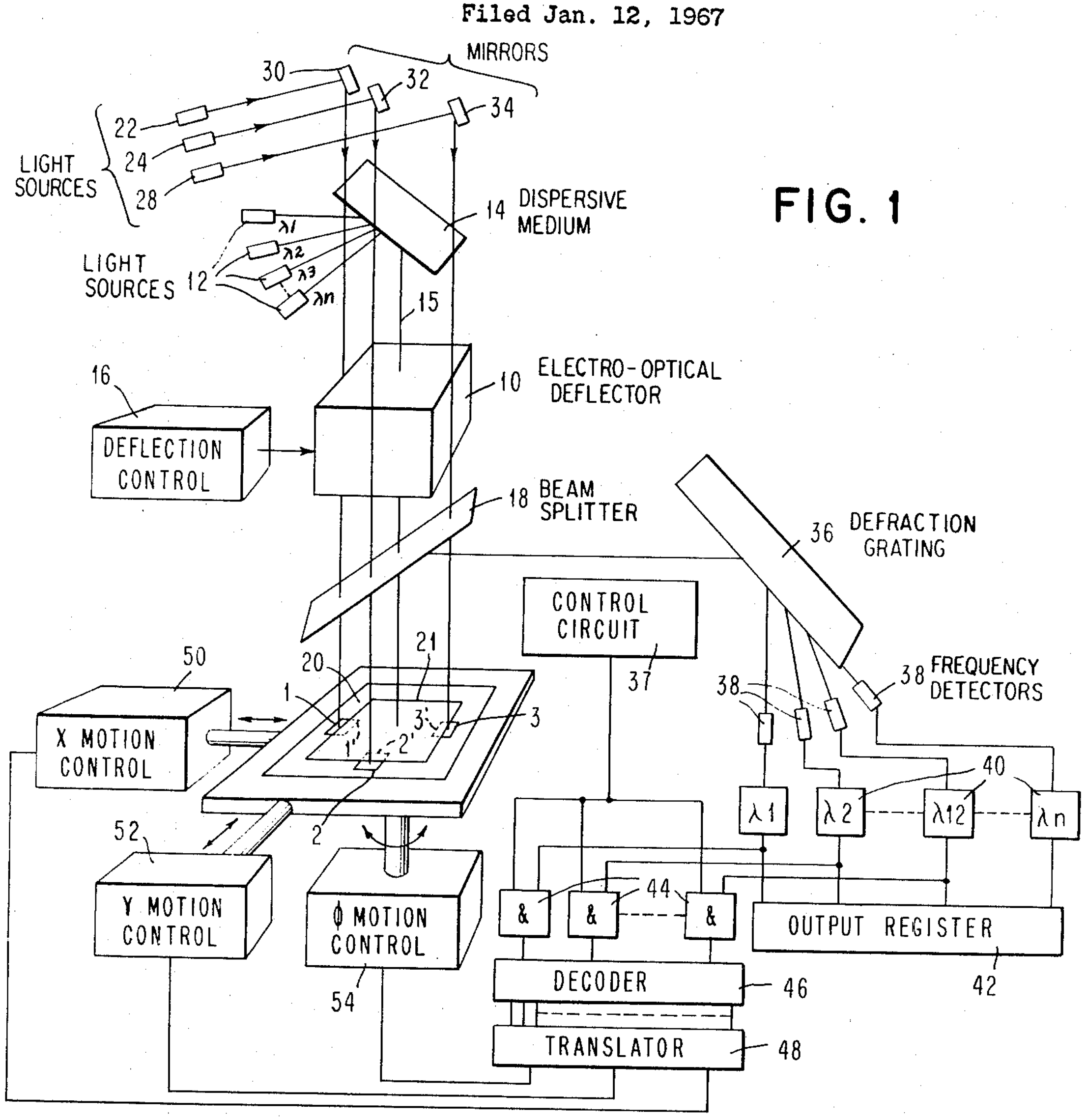
FIG. 1 is a block diagram partially in perspective of a standing wave read-only memory in which the invention is embodied.

Registration areas 1′, 2′ and 3′ are located inside of the information area 21 of the memory plate. Additional light sources 22, 24, 28 are provided and are reflected from mirror surfaces 30, 32, 34, outside deflector 10, through beam-splitter 18, and onto respective registration areas 1, 2 and 3 located outside area 21. The light reflected from the registration areas 1, 2, 3 and 1′, 2′, and 3′ is reflected from the beam splitter 18 onto a grating or dispersive medium 36. The output of the medium 36 is detected by light detectors 38, the outputs of which drive amplifiers 40. The output of the amplifiers 40 drive a read output register 42 and also AND circuits 44. The outputs of the AND circuits 44 drive a decoder 46, the output of which drives a translator 48. The translator 48 provides outputs which drive X-motion control circuitry 50, Y-motion control circuitry 52 and $\phi$-motion control circuitry 54.

The optical memory 20 is placed upon a movable table. Information is recorded in the memory 20 within the boundaries designated by 21 by means of deflection control 16 which energizes an optical light beam deflector 10. Information may be stored anywhere in the memory within the lines 21 by first setting the deflection control 16 to the desired memory location and then energizing combinations of light sources 12 to expose selected frequencies at that location. Three registration areas 1′, 2′, 3′ within memory 20 are shown which are exposed in this manner. The registration area of the memory is exposed in a particular pattern, for example, the pattern shown in FIG. 2. This pattern is exposed by energizing light sources 12 corresponding to the frequencies which it is desired to write at the location selected. Various combinations, of frequencies are written by turning on the corresponding light sources.

Each of the frequencies $\lambda_1$ through $\lambda_8$ are exposed in layers corresponding to the squares defined by solid lines. Each of the frequencies $\lambda_9$ through $\lambda_{12}$ are exposed in superimposed layers corresponding to quadrants defined by dotted lines.

Figure 2:
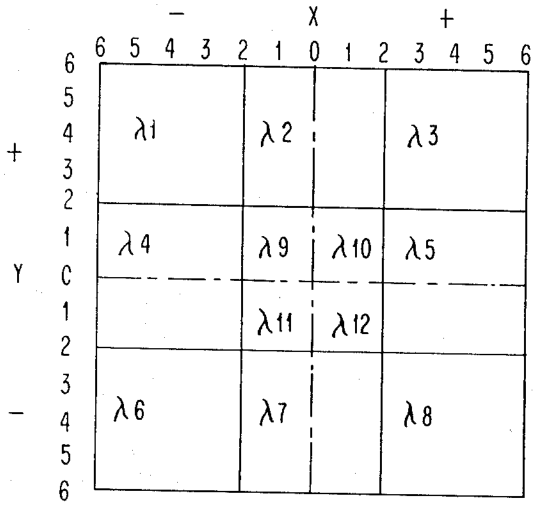
FIG. 2 is an illustration of the format of one of the registration areas shown in FIG. 1.

The registration areas 1, 2 and 3, located outside the memory area must be exposed using white light, filters, and multiple masks to expose the pattern shown in FIG. 2. Such techniques are well known in the field of microelectronic fabrication.

After the registration areas have been exposed according to the pattern, the memory area 21 is exposed accordingto the data to be stored in the memory locations. After the entire plate has been exposed, it is removed and developed. The plate is then returned to the memory to become a read-only memory plate. A fine position sequence is accomplished by energizing the deflection control circuit 16 so that the light beam 15 is deflected to the same spot location where the center of the registration areas were located at the time of the original exposure. The diameter of the light beam used for reading is equal to or less than the width of one of the squares of the pattern shown in FIG. 2. The light beam is reflected from the area to the defraction grating 36. The frequencies present at the spot are separated by the grating and sensed by detectors 38. A pattern of frequency outputs from amplifiers 40 occurs.

For the purpose of example, only two of the three registration areas are needed. For this discussion areas 2′ and 3′, FIG. have been selected. Any two areas could be used; however, it would be necessary to change the rules for angular movement for some combinations.

An example of how this registration system positions the plate to a specifier tolerance can be summarized in the following steps: First one corrects for angular position by sensing a difference in two outputs. The angular servo 54 is rotated until the output register 42 reads the same for both areas. Correction for X and Y errors is made by moving the X and Y servos 50, 52 according to an increment specified by the required tolerance. The correction is made until the specific code corresponding to the center spot is obtained.

In detail the steps for obtaining registration using light sources 12 and beam deflection are as follows: The plate is manually brought to some coarse position so that the reading beam will fall within the registration areas. The light beam 15 is deflected to the location where area 2′ was recorded, the sources 12 are energized, and the detected information is gated via AND's 44 and stored in the decoder 46. For an example of a skewed memory plate this information might appear in output register 42 as follows:

| Area | Output Register |
|---|---|
| 2 | 010000001100 |
| 3 | 000010000101 |

This output register code corresponds to $\lambda_1$–$\lambda_{12}$ recorded as shown in FIG. 2.

The decoder registers the information from area 2′ and compares on a bit-by-bit basis the information from area 3 which is read by beam 15 in the same manner as area 2′. Since they are different, the angular motion servo 54 is activated. The first eight digits of the code, corresponding to $\lambda_1$–$\lambda_8$, are examined. If area 2′ has a lower order, then the $\phi$ servo is first rotated counterclockwise. If area 3′ has a lower code then the $\phi$ servo is rotated clockwise. The $\phi$ servo is rotated each increment until a zero difference is obtained, i.e. until the output codes read from each area are the same. If the end point is reached then the $\phi$ servo is stepped in the opposite direction until a zero difference is obtained.

Once a $\phi$ null is obtained the X and Y servo systems are activated. This is accomplished by moving the servo's in accordance with the error signal sent to the X and Y servos. If the plate is rotated until a zero $\phi$ difference occurs, the resultant code might be, for example, area 2=area 3′=011010000101. If the registration area is divided into a grid as shown in FIG. 2, then the code received from the decoder defines the coordinates; $x=+3$, $y=+1$. Therefore, a position correction change of $x=-3$, $y=-1$ is sent by the translator to the X and Y servo systems. The resultant code upon correction is area 2′=area 3′=000000001111 which corresponds to a zero error signal and the memory plate is registered to the read-out system.

A second mode of operation utilizes light beams from sources 22, 24, 28 directed outside the deflector 10 onto registration areas 1, 2, 3 located outside the memory area 21. Thus the registration procedure does not require energization of the deflection control circuit 16 for registration. The apparatus comprises stationary light sources 22, 24, and 28 which are reflected from mirrors 30, 32, 34 onto registration areas 1, 2 and 3.

The operation is identical to that described for the beam positioning method except that light deflection is not required. The light beams are reflected and rotational and rectilinear motions are imparted the same as for the deflected beam method.

While the invention has been particularly shown and described with reference to a preferred embodiment thereof, it will be understood by those skilled in the art that various changes in form and details may be made therein without departing from the spirit and scope of the invention.

What is claimed is:

1. In a system for positioning a movable element;

a registration area located on said element, said area comprising a photographic film in which light reflecting layers are exposed, so that when struck by a light beam the film reflects a predetermined combination of one or more component light frequencies;

a light source located so as to reflect light from said registration area when said movable element is positioned;

detection means for detecting light reflected from said registration area and for distinguishing component frequencies present in the reflected light; and means for moving said movable element with respect to said light source until said predetermined combination of frequencies is detected by said detection means.

2. In an apparatus for reading from a transparent storage element in which information is stored in the form of light reflecting layers, means for registering said storage element with said reading apparatus comprising:

means for recording at specific registration areas in said memory a pattern of coded frequencies including a predetermined combination of frequencies;

means for reading said pattern;

means for moving said memory relative to said reading means until the registration area is correctly positioned as indicated by a unique coded representation of recorded frequencies.

3. A system for positioning a movable element comprising:

at last two separate registration areas located on said element, said areas comprising a photographic film in which light reflecting layers are exposed so that when struck by a light beam the film reflects one or more component light frequencies, said areas having substantially the same patterns of light frequencies recorded thereon;

means for reflecting light from said areas and for detecting the pattern of frequencies at the spot on said area hit by said light beam;

means for comparing the pattern read from each area; and means for imparting rotational motion to said element until said comparing means indicates that the patterns read are the same.

4. The combination according to claim 3 including means for imparting rectilinear motion to said movable element until the pattern read from one of the registration areas is the same as a predetermined combination of frequencies.

5. A positioning system having X-direction, Y-direction and angular positioning servos for positioning a movable element in response to position vector information, a portion of the element including a standing-wave photographic storage medium, wherein the improvement comprises:

registration areas in the storage medium having a predetermined coded pattern of light frequencies recorded therein;

means for directing a light source at each area;

means for detecting the frequency of light reflected from the areas; and a decoder responsive to said detecting means, including means for changing the detected frequencies into position vector information for driving the positioning servos.

References Cited

UNITED STATES PATENTS

| | | | |
|---|---|---|---|
| 3,107,170 | 10/1963 | Netke | 96—2 |
| 3,324,764 | 6/1967 | Altman | 353—120 X |
| 2,998,746 | 9/1961 | Gievers | 356—152 |
| 3,354,806 | 11/1967 | Lang et al. | 250—219 X |
| 3,358,202 | 12/1967 | Pabst et al. | 250—231 X |
| 3,403,260 | 9/1968 | Geusic et al. | 250—219 |

WALTER STOLWEIN, Primary Examiner

U.S. Cl. X.R.

356—152; 340—173